(12) United States Patent
Cordingley et al.

(10) Patent No.: US 8,379,204 B1
(45) Date of Patent: Feb. 19, 2013

(54) SYSTEM AND METHOD FOR AUTOMATIC LASER BEAM ALIGNMENT

(75) Inventors: James J. Cordingley, Littleton, MA (US); Michael Plotkin, Newton, MA (US); John Keefe, Londonderry, NH (US)

(73) Assignee: GSI Group Corporation, Bedford, MA (US)

(*) Notice: Subject to any disclaimer, the term of this patent is extended or adjusted under 35 U.S.C. 154(b) by 139 days.

(21) Appl. No.: 12/192,915

(22) Filed: Aug. 15, 2008

Related U.S. Application Data

(60) Provisional application No. 60/956,591, filed on Aug. 17, 2007, provisional application No. 60/974,767, filed on Sep. 24, 2007.

(51) Int. Cl.
*G01B 11/00* (2006.01)
(52) U.S. Cl. .......................................... 356/399; 356/401
(58) Field of Classification Search .......... 356/399–401, 356/485, 154; 250/234–235
See application file for complete search history.

(56) References Cited

U.S. PATENT DOCUMENTS

| | | | |
|---|---|---|---|
| 4,564,739 A * | 1/1986 | Mattelin | 219/121.68 |
| 4,615,621 A * | 10/1986 | Allen et al. | 356/399 |
| 5,011,282 A | 4/1991 | Ream et al. | |
| 5,050,111 A * | 9/1991 | Ayata et al. | 700/302 |
| 5,107,365 A | 4/1992 | Ota | |
| 5,315,111 A | 5/1994 | Burns et al. | |
| 5,410,206 A | 4/1995 | Luecke et al. | |
| 5,528,372 A | 6/1996 | Kawashima | |
| 5,923,418 A | 7/1999 | Clark et al. | |
| 6,002,706 A | 12/1999 | Staver et al. | |
| 6,103,991 A | 8/2000 | Domae et al. | |
| 6,448,999 B1 | 9/2002 | Utterback et al. | |
| 6,483,071 B1 * | 11/2002 | Hunter et al. | 219/121.6 |
| 7,133,186 B2 | 11/2006 | Johnson | |
| 7,435,927 B2 * | 10/2008 | Bruland et al. | 219/121.69 |
| 2005/0281101 A1 | 12/2005 | Bruland et al. | |
| 2006/0055928 A1 | 3/2006 | Chang et al. | |
| 2007/0020785 A1 | 1/2007 | Bruland et al. | |
| 2007/0215820 A1 * | 9/2007 | Cordingley et al. | 250/492.22 |

OTHER PUBLICATIONS

Cordingley, J., M430 Beam Positioner Coarse Alignment Procedure 1064 IPG SPW Laser, Jul. 15, 2002, pp. 1-17, Rev. A, GSI Lumonics, Advanced Manufacturing Systems Group, Wilmington, MA, United States.
New Focus, Inc., "Applications of the Picomotor™ in the Semiconductor Industry", Application Note 6, 2001, pp. 1-8, Rev. B, New Focus, Inc., San Jose, CA, United States.
Electro Scientific Industries, Inc., Response to Fourth Office Action to USPTO regarding U.S. Appl. No. 11/481,562, Aug. 29, 2011, pp. 1-11.
Electro Scientific Industries, Inc., Notice of Allowance and Fee(s) Due regarding U.S. Appl. No. 11/481,562, Aug. 29, 2011, pp. 1-5.
Exhibit A—Regarding Use and Sale, Aug. 2, 2011, pp. 1-2.
U.S. Appl. No. 60/580,917, filed Jun. 18, 2004, Bruland et al.

* cited by examiner

*Primary Examiner* — Tarifur Chowdhury
*Assistant Examiner* — Isiaka Akanbi
(74) *Attorney, Agent, or Firm* — Knobbe, Martens, Olson and Bear LLP

(57) ABSTRACT

A method makes a discrete adjustment to static alignment of a laser beam in a machine for selectively irradiating conductive links on or within a semiconductor substrate using the laser beam. The laser beam propagates along a beam path having an axis extending from a laser to a laser beam spot at a location on or within the semiconductor substrate. The method generates, based on at least one measured characteristic of the laser beam, at least one signal to control an adjustable optical element of the machine affecting the laser beam path. The method also sends said at least one signal to the adjustable optical element. The method then adjusts the adjustable optical element in response to said at least one signal so as to improve static alignment of the laser beam path axis.

17 Claims, 12 Drawing Sheets

SYSTEM AND METHOD FOR AUTOMATIC LASER BEAM ALIGNMENT

CROSS REFERENCE TO RELATED APPLICATIONS

This application claims priority to U.S. Provisional Applications 60/956,591 filed on Aug. 17, 2007, and 60/974,767 filed on Sep. 24, 2007.

BACKGROUND OF THE INVENTION

1. Field of the Invention

This invention is related to laser systems. In particular, this invention deals with adjusting alignment of laser beams in laser systems.

2. Description of the Related Art

When fabricating memory circuits, a laser repair system can be used to selectively sever conductive links, effectively removing faulty memory cells from the circuit.

As the size and spacing of link elements decreases, laser repair systems have had to increase in accuracy in order to perform their intended function. The complexity of a laser repair system capable of such accurate operation is significant. Multiple mirrors and other optical elements are used to generate and position a laser beam spot for severing a conductive link. Like the circuit fabrication process itself, laser repair systems are subject to many complex factors. For example, thermal expansion may lead to changes in the orientation or position of optical elements in the path of a laser beam. These changes to the elements that affect the laser beam can cause the laser beam spot to drift away from its intended location and can cause errors when trying to repair a circuit. Although the beam spot position is aligned with reference to wafer alignment markers with every new wafer processed, a misaligned laser beam path that deviates from a normal orientation to the work surface can still produce beam spots of unintended location, shape and/or size which adversely affect operation of the repair system.

U.S. Pat. No. 6,483,071 (hereinafter referred to as the '071 patent) entitled "Method and system for precisely positioning a waist of a material-processing laser beam to process microstructures within a laser-processing site" is assigned the assignee of the present invention. The disclosure of the '071 patent is hereby expressly incorporated by reference in its entirety. The '071 patent discloses many features of a laser based system for memory repair, and is particularly related to accurate (sub-micron) and high-speed positioning of a laser beam waist relative to a link or similar target structure. In the '071 patent, an air-bearing based assembly was disclosed for positioning of optical components (e.g: an objective lens) along the optical (Z) axis. In addition to noise and reliability issues (ie: wearing mechanical parts) it was recognized that X,Y displacement errors during Z axis motion are much better controlled or eliminated with an air bearing system. Such displacements, even if a fraction of a micron, can lead to link severing results which are incomplete (e.g. contamination) or possibly cause damage to surrounding structures. Hence, a displacement of a laser beam from a target location by a fraction of one-micron, corresponding to a fraction of one spot diameter, may generally lead to reduced yield.

Traditionally, laser repair systems have undergone periodic, manual adjustment to correct problems with alignment. For example, every month, a trained technician may have to manually adjust optical elements in order to correct alignment problems that have developed since the last adjustment. In the M430 laser link blowing machine from GSI, coarse adjustments to laser beam alignment were made by manually adjusting the laser beam orientation while viewing the laser beam spot with a "thru-lens viewing system" (TTLV). The TTLV is essentially a camera and TV monitor arrangement coupled to the laser beam path. The spot position was determined relative to a crosshair. The beam was first aligned to be centered in the lens aperture. Then the beam was aligned for zero spot translation during zoom expansion. Zoom adjustments corresponded to a range of spot sizes. If the beam was properly aligned along the Z-axis, the beam would appear stationary on the monitor for all zoom settings. Finer beam alignment was carried out by adjusting the spot size to a minimum, placing a calibration grid on the work surface, and performing iterative manual adjustments of turning mirrors to align the optical system and reduce any lateral (X-Y) displacement to within a specified tolerance.

This traditional approach to adjusting the alignment of a laser beam has several drawbacks. For example, the means used by the technician to determine beam alignment may itself be subject to error. Alignments based on erroneous alignment data may augment alignment problems in the system. Other problems may include the significant time expense involved in manual adjustment. Delays arising from manual alignment can represent a serious cost for businesses operating laser repair systems. For these reasons and others, automated methods of static laser beam alignment have been developed. Such methods are described for example in U.S. Pat. Nos. 5,011,282 to Ream, et al., 5,315,111 to Burns, et al., 5,923,418 to Clark et al., and 6,448,999 to Utterback et al. Of these prior patents, Burns, Clark, and Utterback split off portions of the laser beam to optical detectors placed adjacent to the laser beam path. Alignment of the beam with respect to the detectors is used to deduce alignment of the beam to the workpiece. In the '282 patent to Ream, changes in laser beam spot position on a target are used to determine a laser beam deviation angle, which can then be used to correct the laser beam path alignment.

SUMMARY OF THE INVENTION

In one embodiment, a method is provided for making an adjustment to alignment of a laser beam in a machine for selectively irradiating conductive links on or within a semiconductor substrate. The method comprises setting at least one remotely adjustable beam directing optic in the path of a material processing laser beam, generating a laser beam spot having predetermined irradiance characteristics at or near a semiconductor substrate surface by expanding and focusing the laser beam with optical elements in the path of the laser beam, measuring a position coordinate of a selected target using the laser beam spot a first time, measuring a position coordinate of the target using the laser beam spot a second time, and adjusting the adjustable beam directing optic responsive to data corresponding to the first and second measurements of position, to align the laser beam path whereby conductive links on or within a semiconductor substrate are selectively irradiated after adjusting and wherein the measured target coordinate positions indicate an alignment error that is compensated by the step of adjusting.

The optical elements may comprise a zoom telescope and/or a focus lens. The focus lens or an element of the zoom can be moved between the first and second alignment steps.

In another embodiment, a system for making an adjustment to alignment of a laser beam in a machine for selectively irradiating conductive links on or within a semiconductor substrate comprises a remotely adjustable beam directing optic in the path of a laser beam, a zoom telescope with moveable elements in the laser beam path for variably expanding the laser beam, a lens in the laser beam path for focusing the laser beam to a spot having predetermined irradiance characteristics at or near a semiconductor substrate surface, means for changing the positions of one or more zoom telescope elements and the lens, means for moving a target within a plane relative to the laser beam spot, means for measuring the position of a target relative to the laser beam spot, and means for adjusting the adjustable beam directing optic responsive to a measured position of a target.

In another embodiment, a computer readable medium comprising instructions for processing multimedia data that upon execution cause a link severing machine to generate a laser beam spot having predetermined irradiance characteristics at or near a semiconductor substrate surface by expanding and focusing the laser beam with optical elements in the path of a laser beam, measure a position coordinate of a target using the laser beam spot, change the relative positions of the optical elements, measure a position coordinate of the target using the laser beam spot, and adjust an adjustable beam directing optic in the path of the laser beam responsive to detected first and second measurements of position.

Another embodiment includes a method for making an adjustment to alignment of a laser beam in a machine for selectively irradiating conductive links on or within a semiconductor substrate. In this embodiment, the method comprising adjusting a mirror in a laser beam path responsive to a distance between different beam spot locations on or in the substrate produced by different positions of an objective lens relative to the substrate.

DETAILED DESCRIPTION OF THE PREFERRED EMBODIMENT

Figure 1:
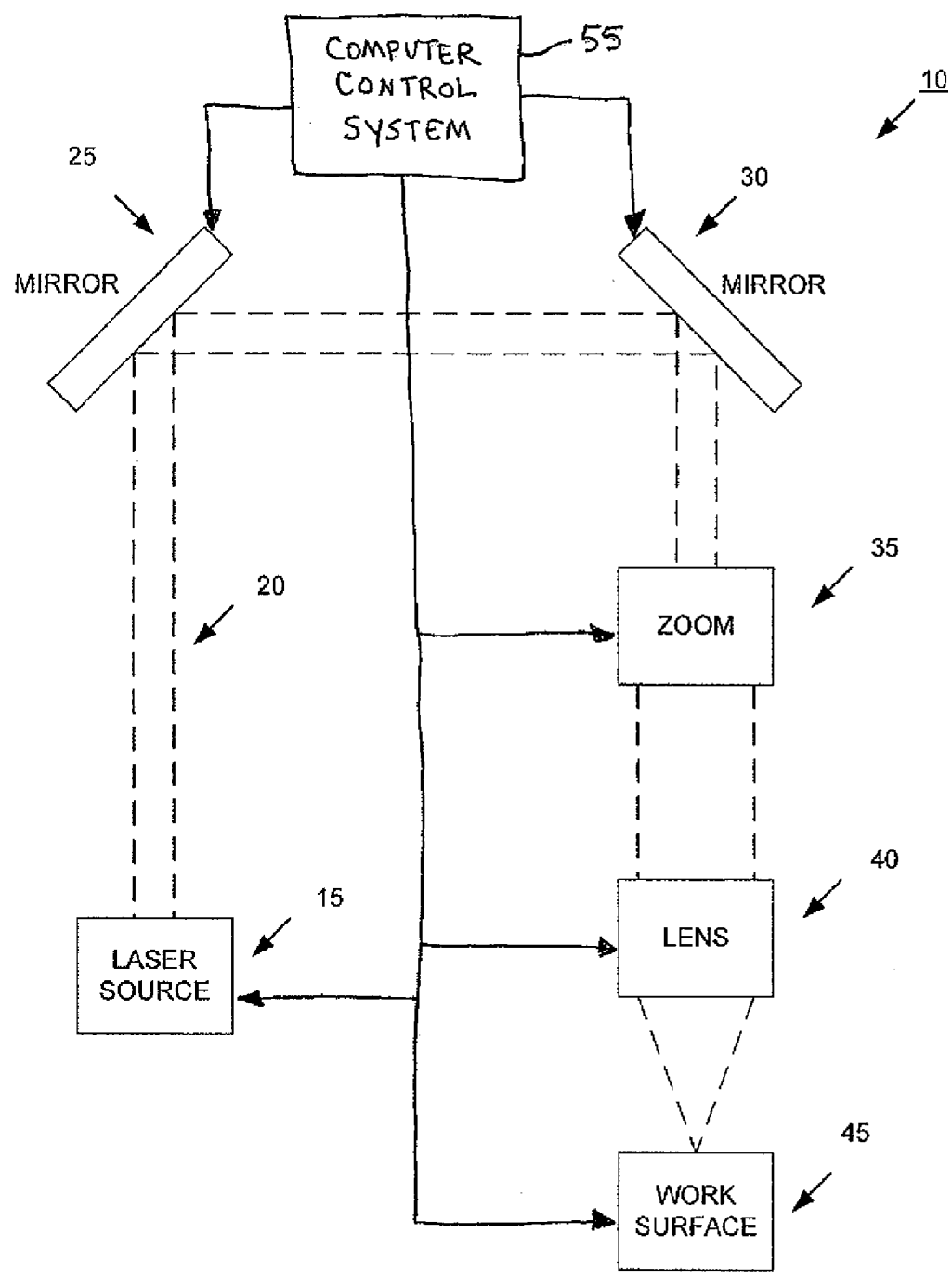
FIG. 1 is a block diagram of a portion of a laser repair system.
Figure 5:
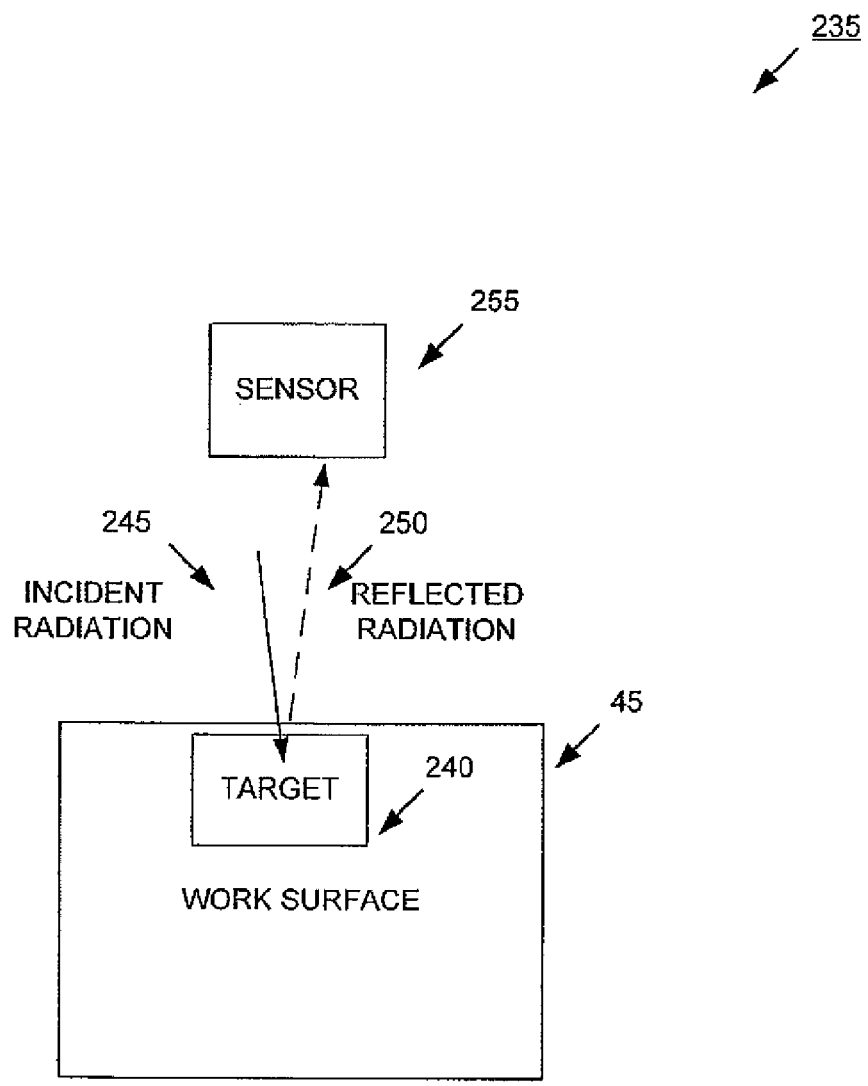
FIG. 5 is a depiction of a sensor for detecting laser beam spot location.

Before describing the present invention in great detail, it may be useful to consider an example environment in which the present invention may be implemented. Referring now to FIG. 1, a laser repair system 10 is illustrated. While aspects of the present invention are described in relation to laser repair system 10, it will be appreciated that the present invention may be utilized in a variety of applications. Further, it will be appreciated that system 10 is a depiction of only a few aspects of a real laser repair system. Numerous additional components of an exemplary laser repair system are shown in the '071 patent. For example, FIG. 2 and FIGS. 7-9 and associated text of '071 disclose several components of a memory repair system embodied in the M4XX series of memory repair machines produced by the assignee of the present invention. FIG. 5 and the associated text relate to a preferred coordinate system used for transformations to specify the location of a laser beam relative to a processing site in a laser processing system utilizing a precision positioning system. In a preferred implementation a calibration step is included for all the motion stages which will result in data which is used in subsequent coordinate transformations (e.g. translation, rotation, scaling) to accurately relate all the coordinate systems and mathematical transforms.

Referring again to FIG. 1, the depicted elements of laser repair system 10 are chosen for their utility in explaining certain embodiments of the present invention. Laser repair system 10 has a laser source 15. Laser source 15 is used to generate a laser beam 20. For the purpose of explanation, the route along which the laser beam 20 propagates may be referred to as the laser beam path. Additionally, for the purpose of explanation, the laser beam 20 may be referred to as having an axis. This axis coincides with the theoretical center of the laser beam path and is aligned with the propagation of the laser beam 20. The path of the laser beam 20 through the laser system 10 is altered by various optical elements forming beam directing optics. For example, system 10 has mirrors 25, 30 which alter the path of the laser beam 20. As described further below, the beam directing optics may comprise reflective optics, refractive optics, diffractive optics, prisms, and the like. As described below, the mirrors 25, 30 may be used correct alignment of the laser beam. It will be appreciated that the orientation and position of mirrors 25, 30 may be adjustable. For example, mirrors 25, 30 may be part of an assembly using a piezoelectric actuator such as an actuator described in U.S. Pat. No. 5,410,206 to Luecke et al. Other types of adjustable mirrors may also be used. The use of an adjustable mirror to adjust laser beam alignment is described below in accordance with an embodiment of the present invention.

System 10 also includes a zoom 35 and objective lens 40 in the laser beam path. It will be appreciated that zoom 35 is used to expand laser beam 20 and that a lens 40 is used to focus laser beam 20. The location in which the laser beam 20 is highly focused may be referred to as a laser beam spot. Generally speaking, the use of a zoom 35 to expand the laser beam 20 before focusing the beam 20 through a lens 40 results in a smaller, more focused laser beam spot. In one embodiment of the present invention, adjustments to laser beam alignment are made while the zoom 35 is set to maximum magnification. System 10 also includes a work surface 45. Generally the optical elements of system 10 are configured to generate a laser beam spot at work surface 45. In one embodiment, the work surface comprises a semiconductor substrate having conductive links and/or alignment targets. In another embodiment, work surface 45 typically rests on a moveable stage. In one example, work surface 45 may be movable in a plane normal to a theoretical, perfectly aligned laser beam 20. Control of the components of the system 10 is provided by a computer control system 55. The computer control system nay store measurement data indicating positions of the laser beam on the work surface and various features of the work surface such as links and alignment targets. The computer control system controls the laser, the beam delivery system, and the position of the work surface. The computer control system also sends signals to the beam directing optics to control beam alignment. As mentioned above, it will be appreciated that system 10 is merely an illustration of aspects of a laser repair system used for the purpose of explanation. Practical laser repair systems may include additional or different elements.

Figure 2:
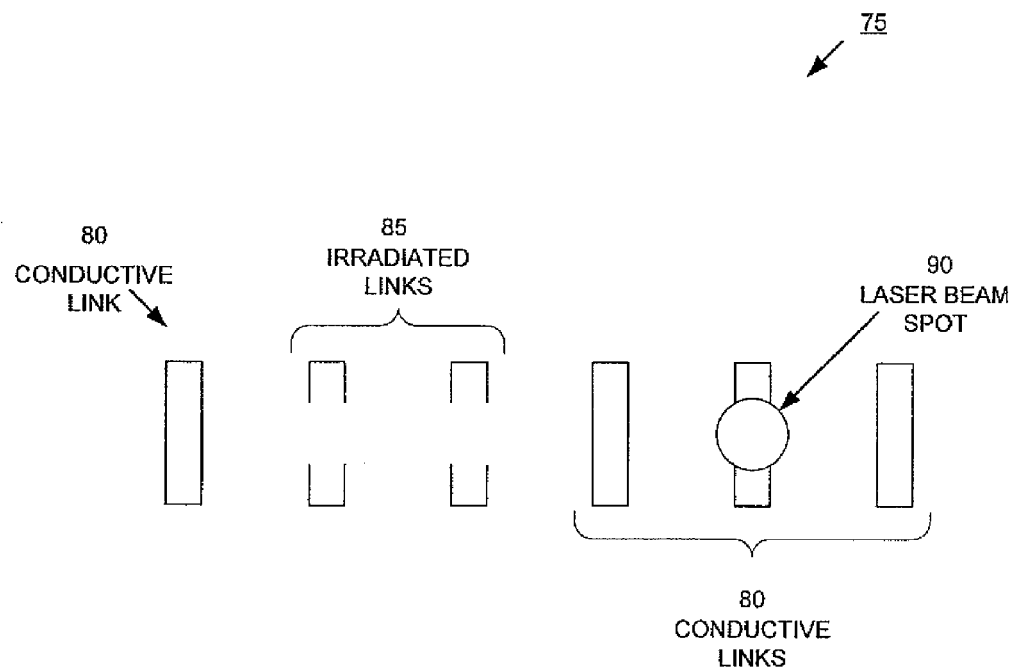
FIG. 2 is a depiction of the operation of a laser repair system.

Continuing with an illustration of an example environment, FIG. 2 depicts a region of substrate 75 on the work surface 45. In this example, the region of substrate 75 has a set of non-processed conductive links 80 and a set of irradiated links 85. During operation, the laser beam spot 90 is positioned at a conductive link and sufficient power is supplied to sever the link. It will be appreciated that the conductive link may be on or within the semiconductor substrate. Various means of changing the position of the laser beam spot 90 relative to work surface 45 exist. For example, in some laser repair systems, the work surface 45 is moved under the laser beam spot 90 while the laser beam path remains in a constant position. In other laser repair systems, optical elements are used to move the laser beam spot 90 while the work surface 45 remains in a constant position. A hybrid of these two approaches is also possible. During operation, the laser beam has an initial beam path with a relative position that is then changed with respect to the work surface. The initial beam path is referred to herein as the "static" beam path. As described above, the static beam path is often stationary during link blowing operations, while the work surface moves beneath it on a motion stage. The position and orientation of the stationary beam trajectory that is independent of relative beam and target motion during normal laser processing operations is the "static alignment" that is altered and corrected with the present invention.

Figure 3:
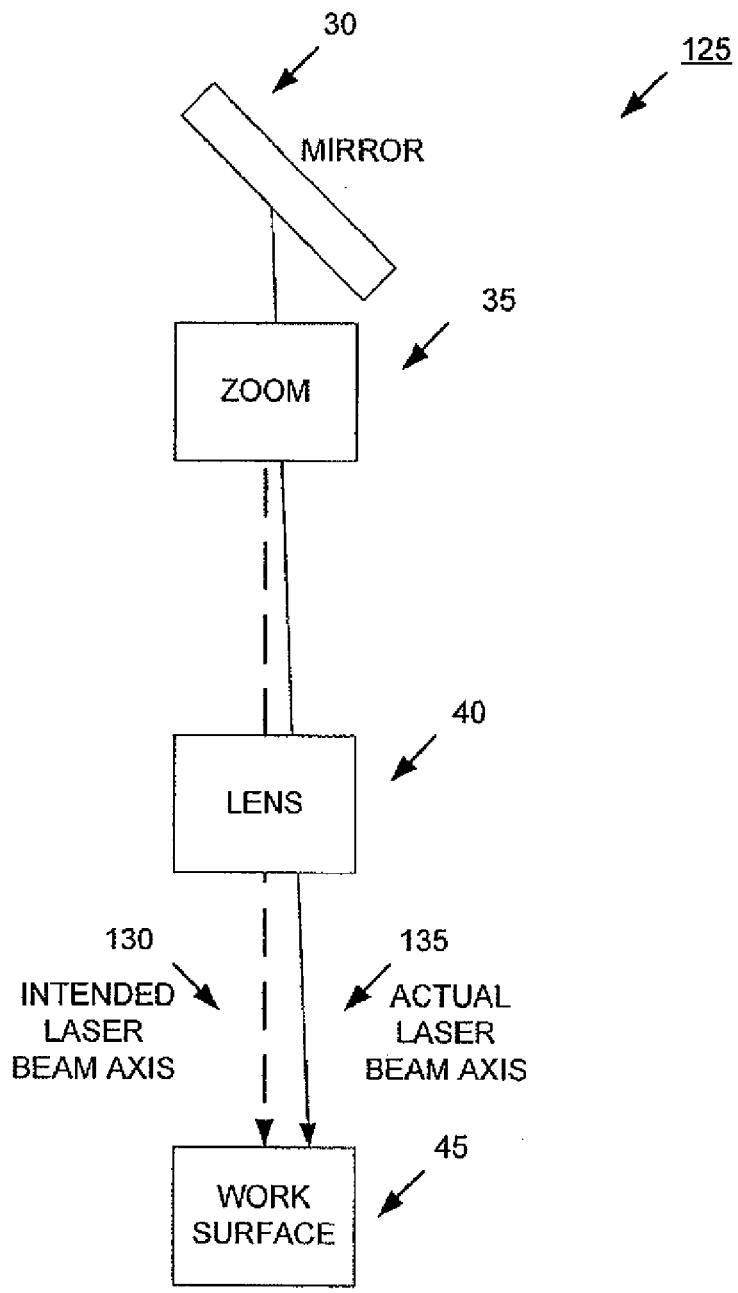
FIG. 3 is a depiction of a laser beam alignment error.

Continuing with an illustration of an example environment, FIG. 3 depicts a portion of the optical path through an example laser repair system 125. It will be appreciated that the process of irradiating certain conductive links in an integrated circuit requires a great deal of precision. Misalignment of the laser beam path can lead to drift of the laser beam spot. If the laser beam spot drifts far enough, the laser repair system may fail to sever a particular link or may damage adjacent links and circuitry. Misalignment of the laser beam path may result from unintentional changes to the alignment of the optical components. For example, thermal expansion may cause a slight variation in the alignment of the mirror 30 in the laser beam path. In another example, vibrations in the work environment may cause optical elements, such as zoom 35 and lens 40, in the laser beam path to shift from their intended alignment. The result of these unintentional adjustments to the optical elements is that the actual laser beam axis 135 may differ significantly from the intended laser beam axis 130. For example, while the intended axis of the laser beam 130 may be normal to the work surface 45, the actual laser beam axis 135 may be incident upon the work surface 45 at some undesired angle.

As described above, this unintentional adjustment to the alignment of optical elements in the laser beam path has traditionally been dealt with by manually adjusting the optical elements. For example, a technician might periodically make adjustments the mirrors 30, 35 in the laser repair system to fix whatever alignment problems that arose since the last manual adjustment was made. This process of manually adjusting for alignment problems can be slow, costly, and inaccurate. For example, the conditions under which the adjustments are made such as ambient thermal conditions might not be identical to the conditions of normal operation. Alternatively, the equipment used to determine misalignment might itself be inaccurate. As will be described below, in one embodiment, the present invention eliminates the problems associated with manual adjustment by providing a method for automated adjustment of laser beam alignment.

Figure 4:
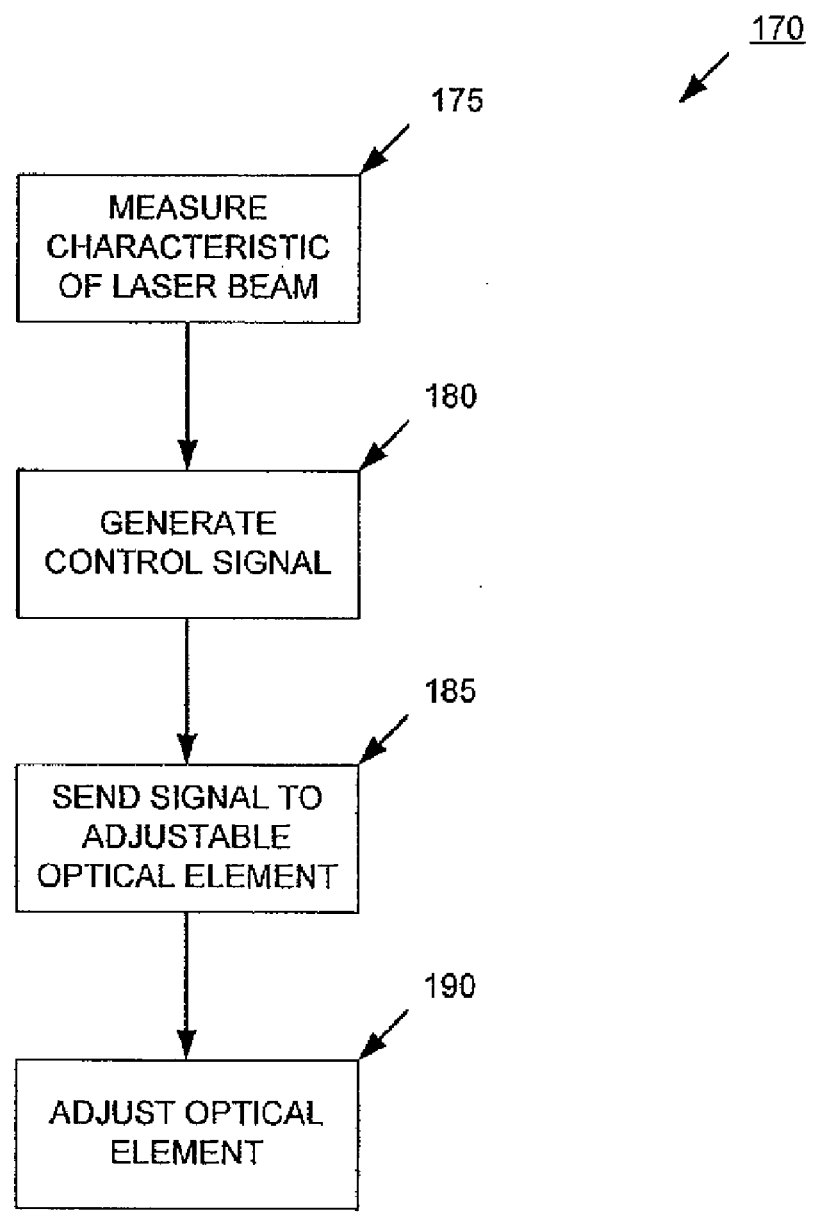
FIG. 4 is a block diagram of a method for adjusting the alignment of a laser beam.

FIG. 4 illustrates a method 170 for adjusting the alignment of a laser beam according to one embodiment of the present invention. Method 170 begins with measuring a characteristic of the laser beam, as shown in step 175. As will be discussed further below, the measured characteristic may be, but is not limited to being, the location of the laser beam spot. Alternatively, the measured characteristic could be the angle of incidence of the laser beam upon the work surface. In another example, the measured characteristic is the angle of incidence of the laser beam upon an optical element in the laser beam path. In one embodiment, a plurality of characteristics of the laser beam may be measured. Alternatively, one or more characteristics of the laser beam may be measured a plurality of times.

After measuring at least one characteristic of the laser beam, a control signal is generated, as shown in step 180. In one embodiment, the control signal may be generated based on the measurement of the laser beam characteristic. For example, a processor might be used to analyze the measurements of the laser beam characteristics. If a measurement was taken that indicates that the laser beam spot had drifted from its intended location, the processor might be used to calculate an adjustment that could be made to compensate for the drift. For example, a previously stored measurement could be compared to the present measurement. If the difference exceeds a certain threshold, a control signal could be generated. In another embodiment, if multiple measurements are taken, the processor may be able to process the plurality of measurements according to an algorithm to more accurately determine desired adjustments. In one embodiment the generated control signal comprises information related to a proposed adjustment. It will be appreciated that the format of the control signal may be any format suitable for communicating information. For example, the control signal might be a series of voltage levels representative of the voltage levels used to drive an actuator. Alternatively, the control signal might comprise a digital representation of instructions for performing an action. In another embodiment, a plurality of control signals may be generated. This plurality may be based on different measured characteristics of the laser beam. Alternatively, the plurality might be generated to affect a plurality of optical elements as described below.

After generating a control signal, the control signal is sent to an adjustable optical element, as shown in step 185. It will be appreciated that the control signal may be sent by wired, wireless, or other communications means according to any appropriate protocol. Further, it will be appreciated that one or more signals may be sent to one or more adjustable optical elements. As describe in relation to an example environment, one or more optical elements affecting the path of the laser beam may be adjustable. For example, mirrors in the laser beam path may be capable of adjustment affecting their orientation or position with respect to the laser beam. In one example, a mirror may be capable of rotation in one or more directions. In another example, a mirror may be capable of positional translation. In another example, zoom or lens components in the laser beam path may be capable of adjustments. It will be appreciated that other optical elements capable of additional adjustments may be used as well. For example, in general, an adjustable optical element may comprise an actuator and any type of optical element that can be affected by the actuator.

After the control signal is sent to the adjustable optical element, the optical element is adjusted, as shown in step 190.

In one example, the adjustment is made responsive to the content of the control signal. For example, the control signal might indicate that an adjustable mirror should be rotated a certain amount in a particular direction. Responsive to the control signal, an actuator may make the indicated adjustment to the alignment of the mirror. In another example, adjusting the optical element comprises translating the position of a mirror, zoom, or lens in the laser beam path. In another example, multiple optical elements may be adjusted.

In one embodiment of the present invention, the adjustment to one or more optical elements is performed with the intent of improving the alignment of the laser beam. For example, if the laser beam is incident upon the work surface at an undesirable angle, an adjustment to the adjustable optical element may cause the axis of the laser beam to a normal orientation with respect to the work surface. Alternatively, if the axis of the laser beam is normal to the work surface as desired, but the location of the laser beam spot is incorrect, adjustable optical elements might be adjusted to translate the axis of the laser beam while maintaining its angle of incidence upon the work surface. For example, two adjustable mirrors could be adjusted in conjunction to effectuate the translation.

In one example, the method 170 described in relation to FIG. 4 may be carried out periodically by a computer controlling the laser repair system. For example, after processing a certain number of circuits, the computer controlling the machine may automatically perform the described steps. In another example, a person operating the laser repair system may cause the repair system to perform steps of the process or may perform certain steps herself. For example, a human operator may measure a characteristic of the laser beam in accordance with step 175 of method 170. Depending on the measurement, the operator may cause a computer controlling the laser repair system to perform the remainder of the steps in method 170. In another example, the method 170 is performed continuously or substantially continuously (e.g. on the order of seconds or minutes). For example, at least one characteristic of the laser beam is continuously or nearly continuously being measured. Control signals are generated based on the measurements and transmitted to the adjustable optical element. The adjustable element is continuously and dynamically adjusted responsive to the control signals. In another example, the method 170 may be performed dynamically as needed. For example, the method 170 may be performed responsive to errors detected by the laser repair system. In another example, the method may be performed responsive to the passing of a certain amount of time.

Referring now to FIG. 5, system 235 is illustrated. As described above, in one embodiment of the present invention, a characteristic of the laser beam is measured. System 235 illustrates an example of a way to measure a characteristic of a laser beam in accordance with one embodiment of the present invention. Work Surface 45 is illustrated in system 235. As described above, work surface 45 is a surface at or near which a laser beam spot is produced by the optical elements of the laser processing system. A target 240 may be present on work surface 45. In one example, target 240 may be a conductive link on or within a semiconductor substrate. In another example, target 240 may be a laser alignment target such as those well known in the art. As illustrated, system 235 makes use of incident radiation 245. In one example, target 240 has physical properties that cause it to reflect a certain amount of incident radiation 245 as reflected radiation 250. A sensor 255 is positioned to be able to detect reflected radiation 250. As described below, system 235 may be used to measure characteristics of a laser beam. For example, system 235 may be used to measure the location of a laser beam spot.

In one embodiment, sensor 255 is capable of distinguishing between patterns of reflected light. For example, sensor 255 may be able to determine if reflected radiation 250 is being reflected by target 240 or by something else. For example, if target 240 is a conductive link on or within a semi-conductor substrate, sensor 255 may be able to tell if reflected radiation 250 is reflecting off the conductive link or the surrounding substrate. In another example, sensor 255 may be able to differentiate between the pattern of reflected radiation from a particular conductive link selected as the target 240 and a different conductive link on or in the semiconductor substrate. In one embodiment, incident radiation 245 is generated by the same laser source in a laser repair system that is used to irradiate and sever conductive links. In this example, the intensity of incident radiation 245 is reduced to a level insufficient to process the conductive link, but sufficient to generate reflected radiation 250 detectable by sensor 255.

In one example, the exact location of a laser beam spot can be determined by moving target 240 into a position coincident with the laser beam spot. For example, the work surface 45 may be a movable surface. Further, the location of the work surface may be determined according to encoders or other measurement system. This measurement system may be an axial coordinate position system. The coordinates of the work surface when the target is coincident with the laser beam spot can be used as an indication of the location of the laser beam spot. In one example, the location of the laser beam spot determined according to a process which may be referred to as scanning. Scanning may comprise moving the work surface relative to the laser beam until the sensor 255 determines that the target 240 is coincident with the laser beam spot. Scanning may comprise moving an edge of a target relative to the laser beam one or more times and determining the edge position relative to the laser beam spot based on radiation detected by sensor 255. The known location of the work surface, target, or other tracked entity can then be imputed to the laser beam spot. It will be appreciated that many patterns of motion may be utilized in scanning to decrease the time taken to determine the location of the laser beam spot. Further, as described above, it will be appreciated that sensor 255 can be used to determine when the target 240 is coincident with the laser beam spot by distinguishing between radiation reflected by target 240 and radiation reflected by other substances.

Many systems for determining laser beam characteristics take measurements at locations other than the work surface 45. For example, quadrant detectors may be used to measure alignment of the laser beam, but traditionally the measurement is not taken at the work surface. Adjusting laser beam alignment responsive to measurements taken away from the work surface may not necessarily resolve problems with the location of the laser beam spot on the work surface. For example thermal expansion may introduce alignment errors further along in the laser beam path after the alignment measurements are taken by the quadrant detectors. By measuring and correcting alignment errors at the work surface during actual conditions of operation in accordance with one embodiment of the present invention, greater accuracy of actual operation may be achieved.

Figure 6A:
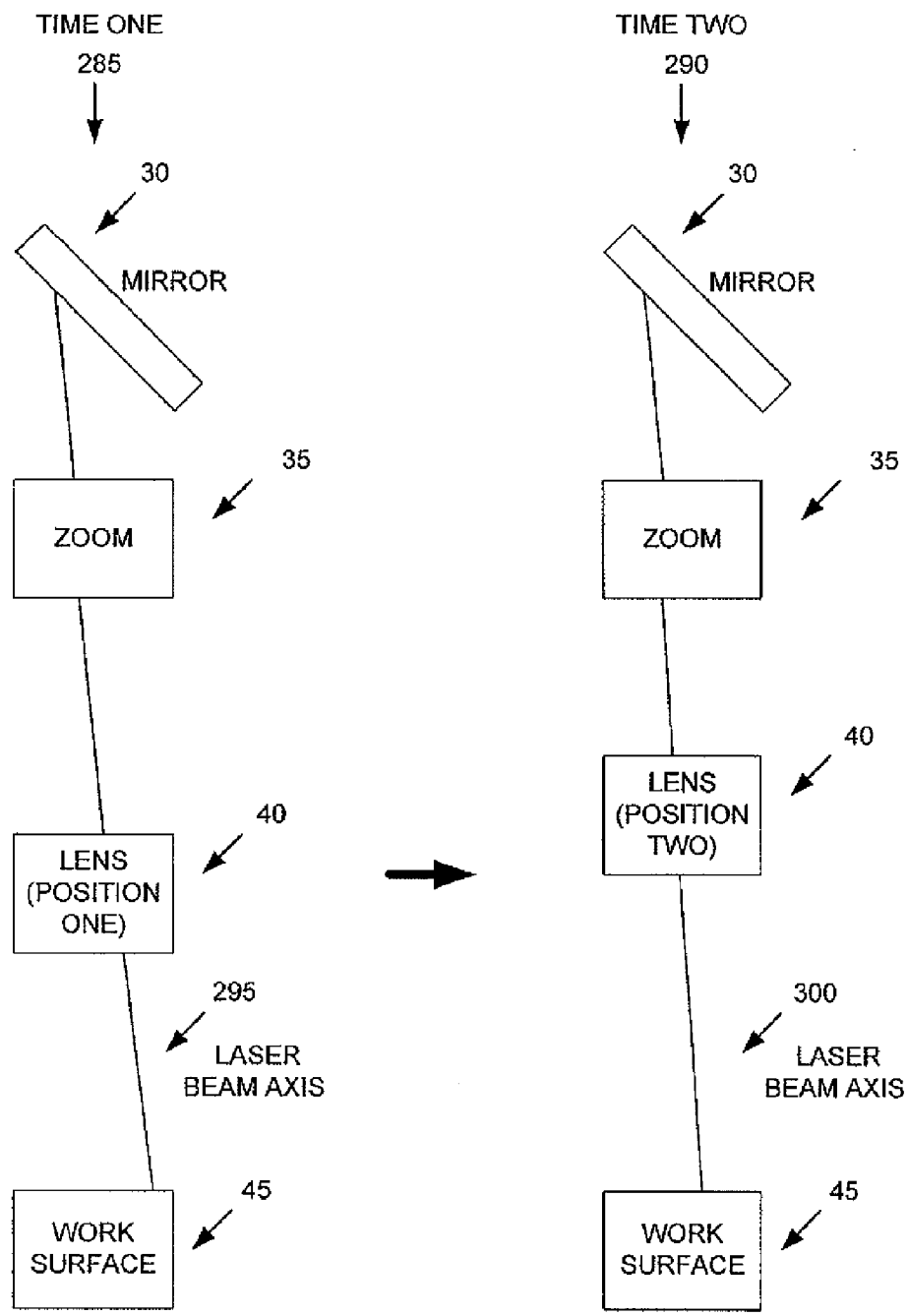
FIG. 6A is a depiction of alternative configurations of elements in a laser beam path.

Referring now to FIG. 6A, a portion of an example laser repair system is shown in two configurations. As described above, and in accordance with one embodiment of the present invention, laser beam spot location may be measured and optical elements in the laser repair system may be adjusted in order to correct for misalignment of the laser beam. FIG. 6A illustrates one example of an improved way to determine misalignment of the laser beam. The illustrated portion of a laser repair system comprises a mirror 30, a zoom 35, a lens 40, and a work surface 45. At time one 285, lens 40 is in a first position relative to the other optical elements in the laser repair system. Further, the configuration of the optical elements at time one 285 result in a laser beam path 295 having a first alignment. The product of the orientation of the optical elements and the laser beam axis 295 is a laser beam spot at a first location at work surface 45. As described before, the exact location of the beam spot at time one can be measured and optical elements such as mirror 30 may be adjusted to correct problems. However, in order to more accurately determine misalignment, in one embodiment of the present invention, a second measurement may be taken with the optical elements in a different orientation. Advantageously, the second measurement in a second configuration allows for simple and accurate determinations of misalignment.

As illustrated, at time two 290, lens 40 has been moved to a second position. One result of moving lens 40 to a second position is that the laser beam axis 300 at time two 290 may be in a second alignment. This second alignment may result in a laser beam spot at a second location on work surface 45. In one embodiment of the present invention, the distance between the location of the laser beam spot at time one 285 and the location of the laser beam spot at time two 290 may be used to determine the misalignment of the laser beam. For example, if a laser beam is perfectly aligned with the zoom 35 and lens 40, moving the lens a limited amount in a direction parallel to the propagation of the laser beam will have no significant effect on the position of the laser beam spot. However, if the laser beam is incident upon the zoom 35 and lens 40 at an angle, moving the lens in a direction parallel to the intended direction of propagation of the laser beam will cause the laser beam spot to shift in position. That shift can be measured and optical elements such as mirror 30 can be used to improve the alignment of the laser beam. It will be appreciated that while the present example has been described in terms of changing the position of the lens 40, the orientation and position of other optical elements may be adjusted to similarly detect misalignment. For example, zoom 35 could also be adjusted to produce a similar drift in the position of the laser beam spot.

Figure 6B:
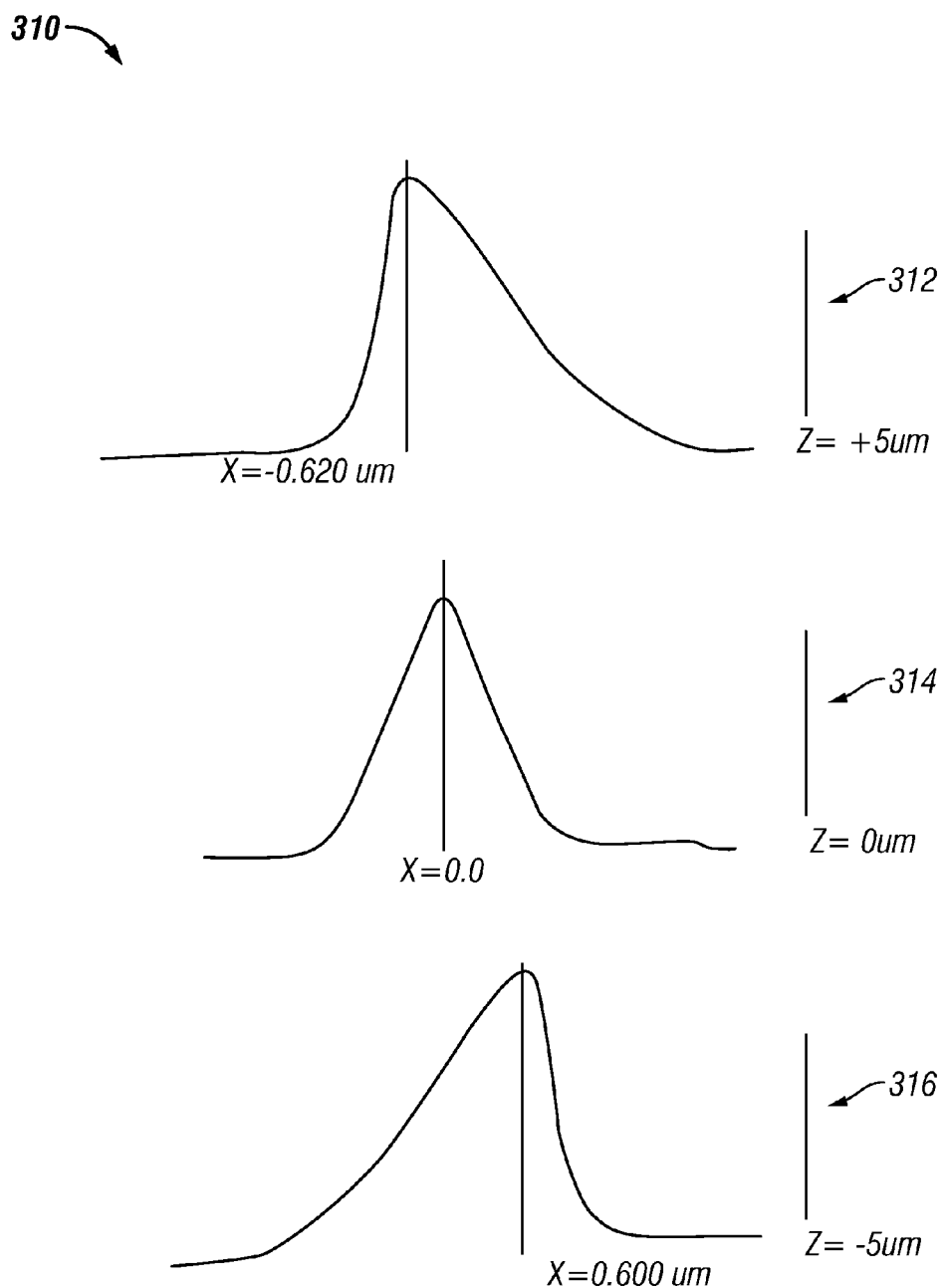
FIG. 6B is a depiction of the effect of alternative configurations of elements in a laser beam path on beam spot shape.

Referring now to FIG. 6B, the effects of misalignment on laser beam spot orientation as a function of optical element position is depicted. For the purpose of explanation, a coordinate system is referenced. The work surface is in the X-Y plane while optical elements are adjusted in the Z axis, an axis theoretically normal to the work surface. In one example, the adjusted optical element is a lens used for focusing the laser beam to a laser beam spot. In a first configuration 312, the lens is positioned at a location corresponding to a Z axis value of positive 5 um. The resulting laser beam spot has its peak intensity shifted to a position corresponding to an X axis value of negative 0.62 um. In a second configuration 314, the lens is positioned at a location corresponding to a Z axis value of zero. The resulting laser beam spot has its peak intensity at a position corresponding to an X axis value of zero. In a third configuration 316, the lens is positioned at a location corresponding to a Z axis value of negative 5 um. The resulting laser beam spot has its peak intensity shifted to a position corresponding to an X axis value of positive 0.6 um. When the laser beam axis is not properly aligned, adjusting an optical element in the laser beam path, such as the lens, may cause the laser beam spot to be distorted. In one embodiment, the present invention involves measuring this distortion and adjusting optical elements in the laser beam path in order to improve the alignment of the laser beam.

Figure 6C:
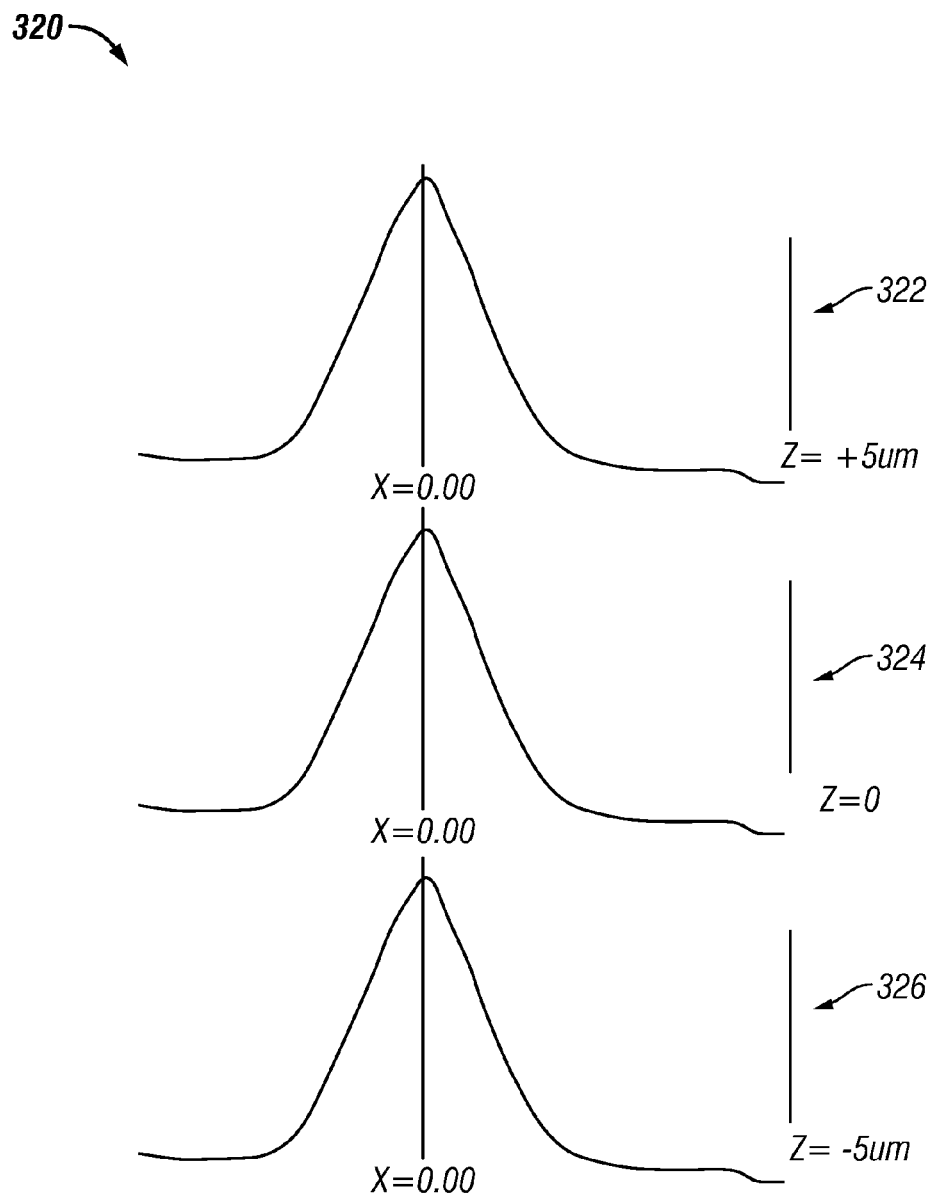
FIG. 6C is a another depiction of the effect of alternative configurations of elements in a laser beam path on beam spot shape.

Referring now to FIG. 6C, the effects of proper alignment on laser beam spot orientation as a function of optical element position is depicted. As opposed to the examples described in connection with FIG. 6B, it will be noted that in illustration 320, the Z position of the lens does not materially affect the location of the laser beam spot peak intensity. As the properly aligned laser beam passes through the lens in configurations 322, 324, and 326, the resulting peak intensity location is unaffected.

Figure 7:
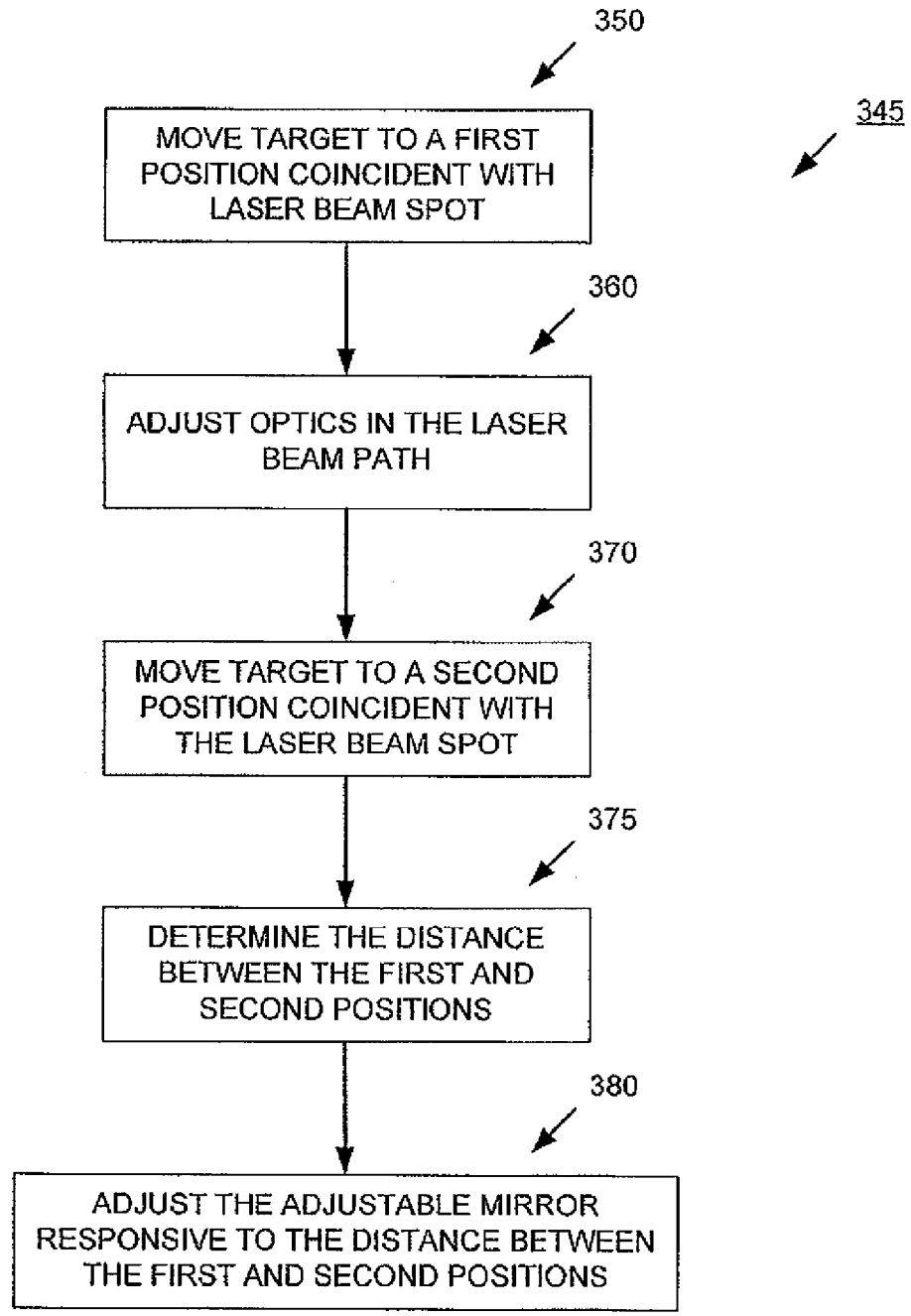
FIG. 7 is a block diagram of another method for adjusting the alignment of a laser beam.

Referring now to FIG. 7, a method 345 far adjusting the alignment of a laser beam in accordance with one embodiment of the present invention is illustrated. Method 345 begins by moving a target in a first position coincident with the laser beam spot, as shown in step 350. As described before, this may comprise scanning by moving the work surface until a sensor determines that a target is at the laser beam spot by detecting the radiation reflected by the target or may comprise moving an edge of a target relative to the laser beam one or more times and determining the edge position relative to the laser beam spot based on radiation detected by the sensor. This step may also comprise storing an indication of the laser beam location. As described before, an indication of the laser beam location may comprise or be derived from the location of the work surface or the target in a coordinate system when the target is at the location of the laser beam spot. After moving the target to the position of the laser beam spot, one or more optical elements in the path of the laser beam are adjusted, as shown in step 360. As described before, this may comprise adjusting the position of a zoom or lens in the laser beam path. For example, a lens may be moved in a direction substantially parallel to the propagation of a theoretical, perfectly aligned laser beam. In another example, the position of a zoom in the path of laser beam may be adjusted. Alternatively, other optical elements could be adjusted. After adjusting one or more optical elements in the path of the laser beam, the target is moved to a second position coincident with the laser beam spot, as shown in step 370. As described above, the adjustment to the optical elements may cause the laser beam spot to shift from its previous position. In one example, step 370 may also comprise storing a representation of the location of the laser beam spot. After moving the target to a second position coincident with the laser beam spot, the distance between the first and second locations of the laser beam spot is determined, as shown in step 375. In one example, the distance may be calculated as an absolute value representing the distance between the two locations. In another example, the distance may be calculated as both a magnitude and direction. In another embodiment, information relating to the orientation of optical elements may be combined with a distance measurement in order to calculate the change in the alignment of the laser beam axis resulting from the adjustment of the optical elements. After determining the distance between the first and second positions, an adjustable mirror in the path of the laser beam is adjusted, as shown in step 380. In one example, the magnitude and direction of the adjustment are determined responsive to the distance between the first and second position of the laser beam spot. For example, a large distance between the first and second locations of the laser beam spot may cause a large adjustment in the position or orientation of the adjustable mirror. In another example, a plurality of adjustable mirrors affecting the laser beam path may be adjusted. In another example, optical elements other than mirrors may be adjusted. For example, it will be apparent to those of skill in the art that refractive beam path elements can be used and adjusted instead of or in addition to reflective beam path elements. These may include, but are not limited to, a lens, a zoom, a collimator, a filter, or other optical elements. One example of a refractive beam adjustment element is a rotating or otherwise moving prism. Such a devices and methods are illustrated, for example, in U.S. Pat. No. 4,685,775 and in U.S. Pat. No. 5,262,887. Other such devices would include the rotating wedge prisms for example U.S. Pat. No. 4,118,109, adjustable prisms with a spherical interface for example U.S. Pat. No. 1,735,108, as well as fluid filled adjustable prisms and electro-wetting fluid based devices for example U.S. Pat. No. 6,917,456. Lateral motion of a lens or diffraction grating can also be used. If a lens moves normal to a beam path through the lens, controlled directional shifts of the beam path can be produced.

In advantageous embodiments, the effect of step 380 may be to reduce the distance between the first and second positions of the laser beam spot upon subsequent performance of method 345. In another example, method 345 may be repeated until the distance between the first and second locations of the laser beam spot falls below a certain threshold. Alternatively, the method 345 may be repeated a set number of times or for a set period of time. In another embodiment, if the distance between the first and second location of the laser beam spot is below some threshold, the alignment of the laser beam may be accurate enough and no adjustment is made.

Example

Figure 8:
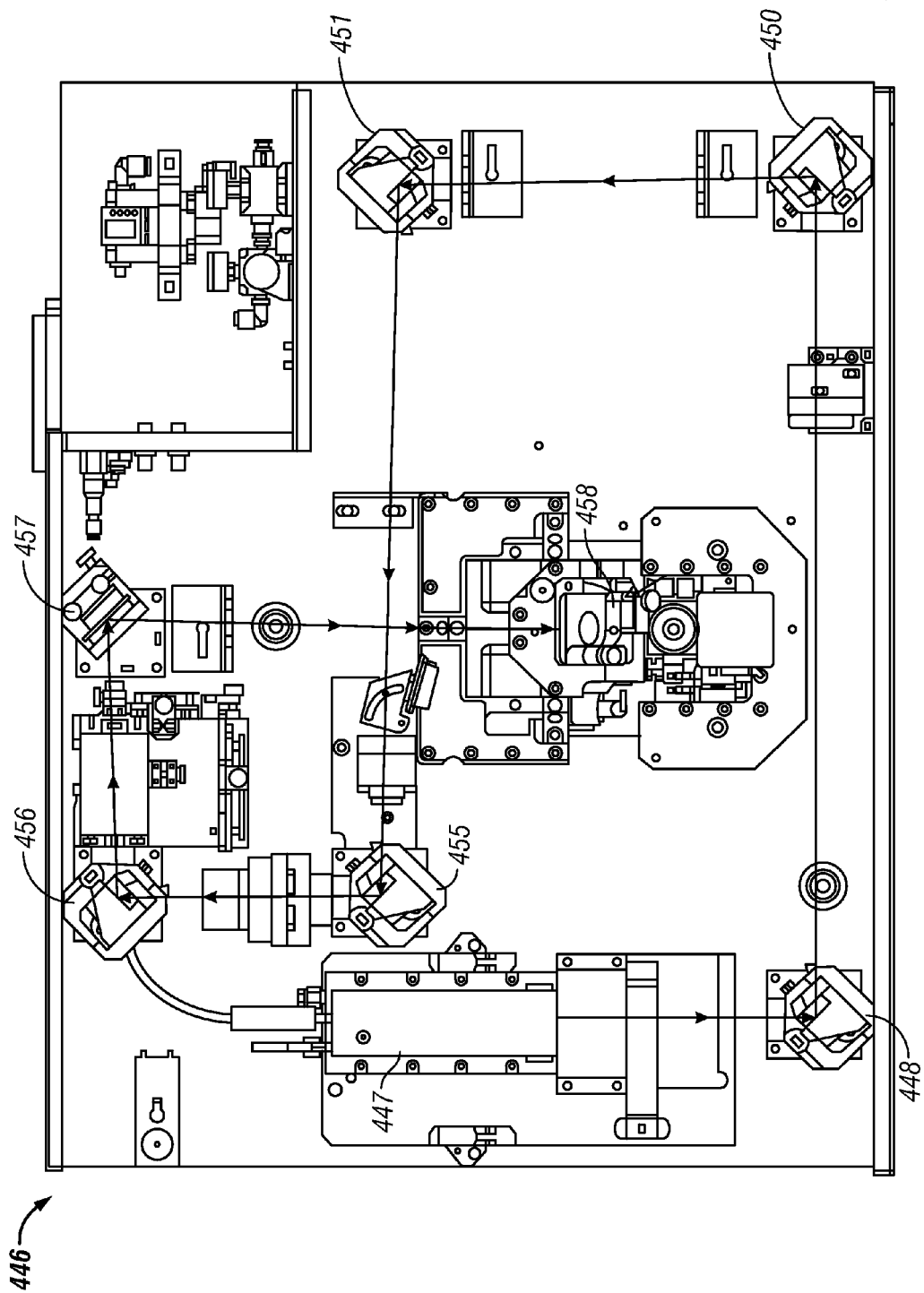
FIG. 8 is a more detailed depiction of a portion of a laser repair system.
Figure 9:
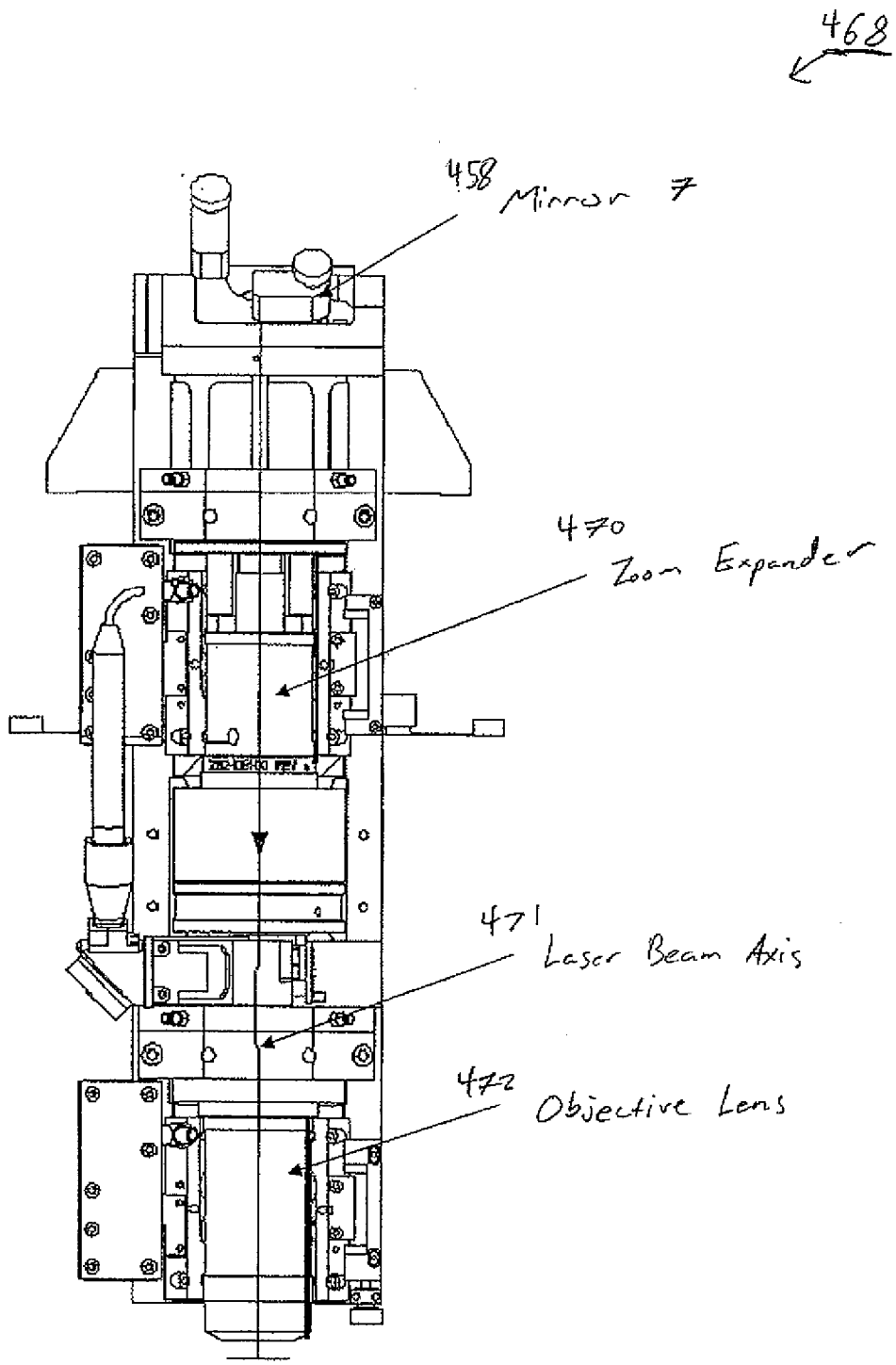
FIG. 9 is a more detailed depiction of another portion of a laser repair system.
Figure 10:
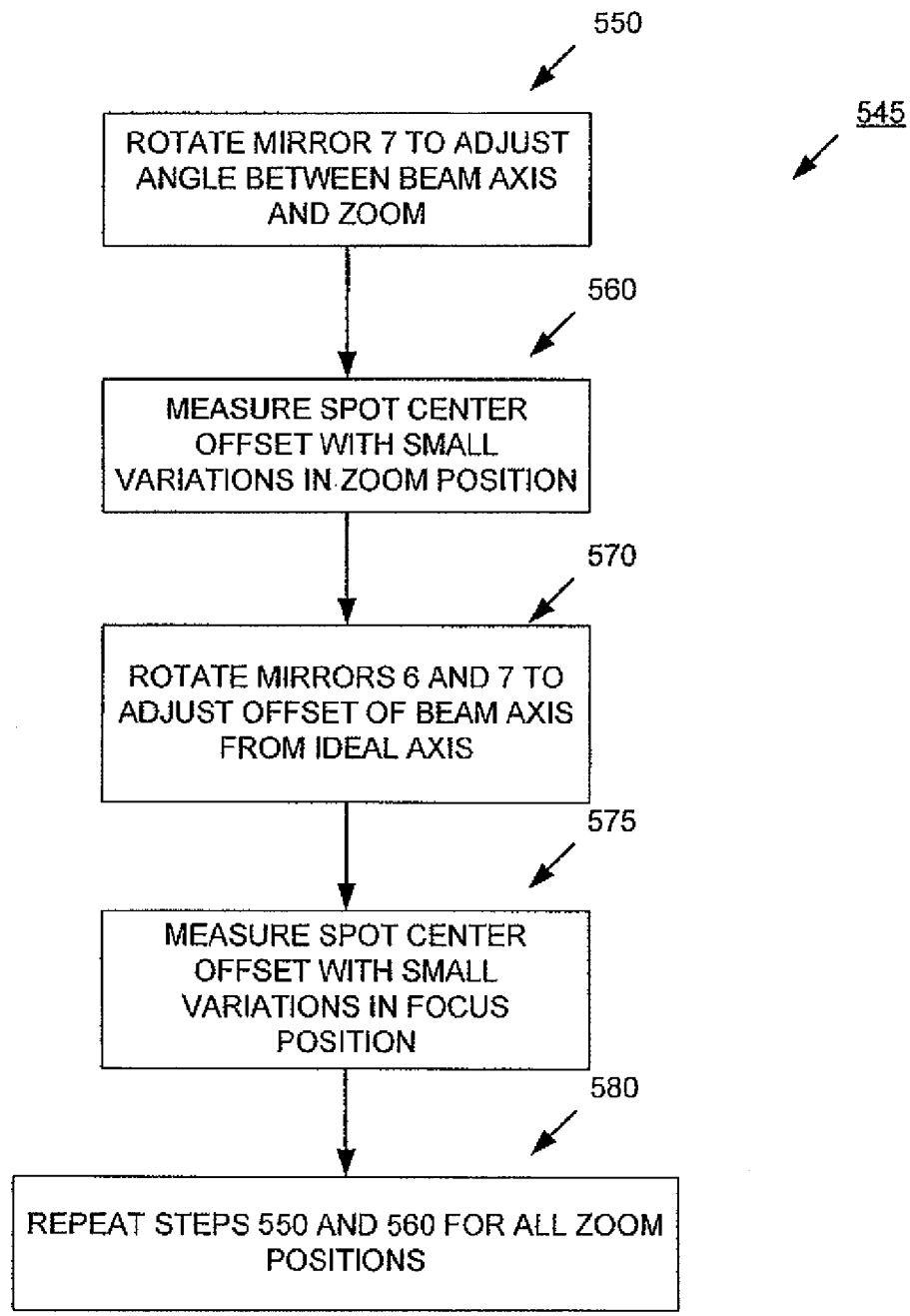
FIG. 10 is a flowchart of a method of alignment that can be implemented with the system of FIGS. 8 and 9.

FIGS. 8, 9, and 10 describe an embodiment of the invention as an improved version of the M430 that was reduced to practice by the inventors and those working at their direction in the year 2005.

Turning mirrors described in the '071 patent (corresponding to mirrors 28 and 30 in the schematic illustration of FIG. 1 herein) were replaced with New Focus Inc. Pico Mirrors, part #8807. The fine alignment was carried out with the adjustable Pico Mirrors rather than with iterative manual adjustment. The improvements provided by the enhanced system exceed the performance of the earlier M430 alignment process.

Referring now to FIG. 8, a more detailed depiction of aspects of a laser repair system 446 is shown. It will be appreciated that while system 446 depicts a laser repair system in more detail, the illustrated embodiment is not the only one in which the present invention may be employed.

System 446 has a laser source 447 for generating a laser beam. The path and properties of this laser beam may be affected by one or more optical elements of system 446. For example, the path of the laser beam may be affected by one or more mirrors such as mirrors 448, 450, 451, 455, 456, 457, and 458.

In addition to mirrors, laser repair system 446 may have other optical elements that affect the path or other properties of the laser beam. In one embodiment, these may include an, energy dump, one or more AOMs, and one or more beam dumps. Additional elements such as one or more shutters, collimators, beam pre-expanders, LCVR's, PSPD and laser-eye photodiodes, alignment stakes, AOM depolarizer assemblies, relay lenses, optical isolators, pre-AOM power detectors, post-AOM power detectors, and laser-eye power detectors may be included in system 446 as well depending on the implementation. In another embodiment, an inspection microscope assembly may also be included for use in the laser repair system 446.

It will be appreciated, that, in one embodiment, one of the mirrors 458 acts as a folding mirror, directing the laser beam in a direction normal to the plane in which the beam propagates through system 446. In one example, the folding mirror 458 is positioned relative to an assembly referred to as an optical rail in order to direct the beam through the elements in the optical rail and down to the work surface. Referring now to FIG. 9, elements of an optical rail 468 are illustrated in greater detail. It will be appreciated that the illustrated elements are examples of elements that may be found in an optical rail and that the present invention need not be limited to implementation in the present example. For continuity of explanation, a portion of folding mirror 458 is duplicated in the depiction of optical rail 468. In one example, after reflecting off the mirror, the laser beam passes through a zoom expander 470. In one embodiment, the zoom expander magnifies the laser beam by a factor between two and eight. For example, if the incident beam has an approximate diameter of 2.5 min, the expanded beam will have an approximate diameter of 5 mm to 20 mm depending on the zoom setting. In one embodiment, the zoom is mounted on a movable sled which rides on an air bearing. In another example, optical rail 468 has an objective lens 472 for focusing the laser beam down to a laser beam spot at or near the work surface. In one embodiment, the objective lens 472 may be a multi element, low f number lens capable of generating spot sizes as small as 1.7 um. The objective lens may also be mounted on a movable sled riding on an air bearing. In another embodiment, the optical rail may also include a through lens viewing system for generating images of the work surface. It will be appreciated that other optical rails may contain additional, fewer, or different elements. For example, one or more collimators may be used.

In one embodiment, the final alignment of the laser beam is performed using mirrors 6 and 7 depicted in FIG. 8. Mirrors having electronically controlled orientation are commercially available. The device depicted in FIG. 8 was constructed with mirrors 457 and 458 comprising center mount mirrors and control motors obtained from New Focus, Inc. of San Jose Calif. (P/N 8807). These New Focus Picomotor™ line of control motors have position resolution suitable for use in link blowing systems. As described previously, and in accordance with an embodiment of the present invention, these adjustable mirrors may be used to adjust static beam alignment in the laser repair system 446.

The coordinated configuration of these two mirrors causes the laser beam axis to coincide with the theoretical ideal axis of the optical elements in the optical rail. One embodiment of the invention corresponding to a method of fine adjustment is described in relation to FIG. 10. Method 545 of FIG. 10 begins by rotating mirror seven (the folding mirror) to adjust the angle between the beam axis and a theoretical plane of the zoom, as shown in step 550. Drift in spot position is then measured while the objective lens remains still and the zoom position is adjusted, as shown in step 560. In one example, steps 550 and 560 are repeated until spot drift falls below some threshold.

Mirrors 6 and 7 can then be rotated in conjunction in order to adjust for offset of the beam from the ideal axis as shown in step 570. Spot center offset is measured with a fixed zoom position and small variations in focus position, as shown in step 575. It will be appreciated that steps 570 and 575 may also be repeated until spot drift is reduced below some acceptable threshold. As shown in step 580, steps 550 and 560 may be repeated for all zoom settings in order to ensure proper alignment for all zoom ratios.

As discussed above, the present method of operation provides several advantages over the alignment methods traditionally employed. For example, traditional manual adjustment involved opening up the casing surrounding the optical components (the beam box) to access the adjustable optical elements. In one embodiment of the present invention, adjustments can be made to the adjustable mirrors while the beam box remains closed. This increases the effectiveness of adjustment by eliminating thermal drift and other variations introduced by opening the beam box. Another advantage of an embodiment of the present invention is that spot drift measurement and mirror adjustment may be done automatically. This may reduce the time expended on adjustments and may limit errors introduced by human operators. In another embodiment, certain aspects of the alignment process may involve human operation. Advantageously, this provides for flexible control and adaptation of the alignment process. In some embodiments, system set up can include a "coarse" alignment procedure performed manually, and a "fine" alignment procedure performed with the equipment closed up in a more automated manner. The coarse alignment may involve getting the beam basically centered through the optics to the workpiece. The fine alignment produces an optimization of beam path over different zoom and focus lens positions.

If desired, the entire process can easily be implemented as a software/firmware routine that can be initiated by the user with few (or even one) command(s). Software controlled periodic initiation of an automated static alignment routine is also easily implemented. In advantageous embodiments, the accuracy of the alignment may be determined at the work surface to minimize the likelihood of errors at the work surface. Further, the system may repeat the alignment process as determined to be sufficient to ensure sufficiently accurate alignment.

While the best modes for carrying out the invention have been described in detail, those familiar with the art to which this invention relates will recognize various alternative designs and embodiments for practicing the invention. For example, similar to what is set forth in column 3, lines 52 to 60 of U.S. Pat. No. 6,448,999, applications of the above alignment principles to multiple beam laser processing systems will be apparent to those in the art based on the above disclosure and are covered by the scope of the claims below.

What is claimed is:

1. A method for making an adjustment to alignment of a laser beam in a machine for selectively irradiating conductive links on or within a semiconductor substrate, wherein the beam intersects a plurality of optical elements that affect a position of a laser beam spot with respect to the conductive links at different focus lens positions, wherein the method provides remote adjustments to the laser beam alignment to correct for periodic misalignments of the laser beam and the position and orientation of the optical components in the machine that may otherwise lead to laser spot position thermal drift, reduced yield, manual adjustment errors or delayed system operation, the method comprising:

setting at least one remotely adjustable beam directing optic in the path of a material processing laser beam;

generating a laser beam spot having predetermined irradiance characteristics at or near a semiconductor substrate surface by expanding and focusing the laser beam with optical elements comprising a zoom telescope to adjustably expand the laser beam and a dynamic focus lens in the path of the laser beam;

measuring a position coordinate of a selected target using the laser beam spot a first time at a first focus lens position;

moving the focus lens;

measuring a position coordinate of the selected target using the laser beam spot a second time at a different focus lens position; and remotely adjusting the adjustable beam directing optic responsive to data corresponding to the first and second measurements of position of the selected target, to align the laser beam path whereby conductive links on or within a semiconductor substrate are selectively irradiated after adjusting and wherein data corresponding to the measured selected target coordinate positions indicate an alignment error that is compensated by the step of adjusting.

2. The method of claim 1 further comprising transmitting a control signal to the adjustable beam directing optic, the control signal corresponding to a beam alignment change and maintaining the beam optic in a static state during selective irradiation.

3. The method of claim 1, wherein the alignment error comprises one of: a system drift over time and a movement of an optical element.

4. The method of claim 1 further comprising repeating the steps of generating, measuring and adjusting after one of: a predetermined time, an elapsed time, an error indication, an operator command, or completion of predetermined number of wafer processing operations.

5. The method of claim 1 wherein the selected target is one of a conductive link on or within a semiconductor substrate, an alignment target on or within a semiconductor substrate, and a calibration grid placed on the work surface.

6. The method of claim 1 further comprising detecting a reflection of the laser beam to determine a target position coordinate using the laser beam spot.

7. The method of claim 1 wherein the remotely adjustable beam directing optic is one of a reflective optic, a refractive optic, a diffractive optic, and a prism.

8. The method of claim 1 further comprising: measuring a respective position coordinate of multiple selected targets, storing position data from the multiple targets and remotely adjusting responsive to the stored data.

9. A non-transitory computer readable medium for use with a link severing machine, the link severing machine comprising a laser beam for selectively irradiating conductive links on or within a semiconductor substrate, wherein the beam intersects a plurality of optical elements that affect a position of a laser beam spot with respect to the conductive links at different focus lens positions, the computer readable medium comprising instructions for processing data so as to provide remote adjustments to the laser beam alignment to correct for periodic beam misalignments of the laser beam and the position and orientation of the optical components in the machine that may otherwise lead to laser spot position thermal drift, reduced yield, manual adjustment errors or delayed system operation, the instructions causing the link severing machine to:

generate a laser beam spot having predetermined irradiance characteristics at or near a semiconductor substrate surface by expanding and focusing the laser beam with a zoom telescope and a focusing lens in the path of a laser beam;

measure a first position coordinate of a selected target using the laser beam spot;

change the relative positions of the zoom telescope and focusing lens;

measure a second position coordinate of the selected target using the laser beam spot; and remotely adjust an adjustable beam directing optic in the path of the laser beam responsive to the measured first and second position coordinates.

10. The non-transitory computer readable medium of claim 9, further comprising an instruction for processing data that upon execution causes a link severing machine to move the selected target relative to the laser beam spot and to detect a reflection of the laser beam to measure a position coordinate of the selected target.

11. A method for making an adjustment to an alignment of a laser beam in a machine for selectively irradiating conductive links on or within a semiconductor substrate, wherein the beam intersects a plurality of optical elements that affect a position of a laser beam spot with respect to the conductive links at different focus lens positions, wherein the method provides remote adjustments to the laser beam alignment to correct for periodic beam misalignments of the laser beam and the position and orientation of the optical components in the machine that may otherwise lead to laser spot position thermal drift, reduced yield, manual adjustment errors or delayed system operation, the method comprising:

setting at least one remotely adjustable beam directing optic in a path of a material processing laser beam;

setting a first distance of a focus lens relative to a focus target on or within the substrate to generate a laser beam spot in a first focus plane, measuring a first position of the focus target with the beam using the first focus lens distance;

setting a second distance of the focus lens relative to the focus target to generate the laser beam spot in a second focus plane, measuring a second position of the focus target with the beam using the second focus lens distance;

adjusting the remotely adjustable beam directing optic responsive to data corresponding to the first and second measurements of the focus target position to align the laser beam path; and selectively irradiating a conductive link on or within the substrate after adjusting the remotely adjustable beam directing optic.

12. The method of claim 11, wherein transverse lens motion is controlled over a range of axial adjustment during the steps of setting the first and second focus lens distances.

13. The method of claim 12, wherein the transverse lens motion is generally parallel to the substrate plane and less than 1 micron over the range of axial adjustment.

14. The method of claim 12, wherein axial adjustment comprises moving the focus lens along an axis substantially perpendicular to the plane of the substrate and supporting the lens with an air bearing.

15. The method of claim 11, wherein the laser beam path is altered by at least one adjustable beam directing optic before passing through a beam expanding optic.

16. The method of claim 11, wherein selectively irradiating the conductive link comprises positioning a focused laser beam spot on the conductive link by following a computed surface.

17. The method of claim 16, wherein transverse motion of the laser beam spot relative to conductive link is substantially eliminated during axial motion of the focus lens, wherein axial motion of the focus lens is substantially perpendicular to the substrate and transverse motion of the laser beam spot is substantially parallel to the substrate.

* * * * *